(12) United States Patent  (10) Patent No.: US 7,197,221 B2
Ohtsu et al.  (45) Date of Patent: Mar. 27, 2007

(54) OPTICAL WAVEGUIDE FILM, AND LIGHT TRANSMISSION AND RECEPTION MODULE

(75) Inventors: Shigemi Ohtsu, Ashigarakami-gun (JP); Toshihiko Suzuki, Ashigarakami-gun (JP); Keishi Shimizu, Ashigarakami-gun (JP); Kazutoshi Yatsuda, Ashigarakami-gun (JP); Akira Fujii, Ashigarakami-gun (JP); Eiichi Akutsu, Ashigarakami-gun (JP)

(73) Assignee: Fuji Xeorx Co., Ltd, Tokyo (JP)

( * ) Notice: Subject to any disclaimer, the term of this patent is extended or adjusted under 35 U.S.C. 154(b) by 0 days.

(21) Appl. No.: 11/354,188

(22) Filed: Feb. 15, 2006

(65) Prior Publication Data

US 2007/0019914 A1  Jan. 25, 2007

(30) Foreign Application Priority Data

Jul. 25, 2005 (JP) ............................. 2005-214925

(51) Int. Cl.
*G02B 6/10* (2006.01)
*G02B 6/12* (2006.01)

(52) U.S. Cl. ........................................ 385/130; 385/14

(58) Field of Classification Search ..................... None
See application file for complete search history.

(56) References Cited

U.S. PATENT DOCUMENTS

| 4,750,799 | A | * | 6/1988 | Kawachi et al. | ............... | 385/14 |
| 5,835,458 | A | * | 11/1998 | Bischel et al. | ............ | 369/44.12 |
| 6,579,398 | B1 | * | 6/2003 | Ogawa | ........................ | 156/230 |
| 2003/0196746 | A1 | * | 10/2003 | Ogawa | ........................ | 156/230 |
| 2005/0046011 | A1 | * | 3/2005 | Chen et al. | ................. | 257/705 |

FOREIGN PATENT DOCUMENTS

| JP | A-04-281406 | 10/1992 |
| JP | A-2000-235127 | 8/2000 |
| JP | A-2005-037592 | 2/2005 |

* cited by examiner

*Primary Examiner*—Kaveh Kianni
(74) *Attorney, Agent, or Firm*—Oliff & Berridge, PLC

(57) ABSTRACT

An optical waveguide film that can supply power at extremely low cost, and a light transmission and reception module using this film are provided.

A macromolecular optical waveguide film is composed of a square-shaped waveguide core which extends in a film length direction, a conductive wires which extends in the film length direction and is arranged in parallel with the waveguide core, and a cladding which surrounds the waveguide core and the conductive wire. The two conductive wires are provided, and the waveguide core is provided between the two conductive wires.

6 Claims, 11 Drawing Sheets

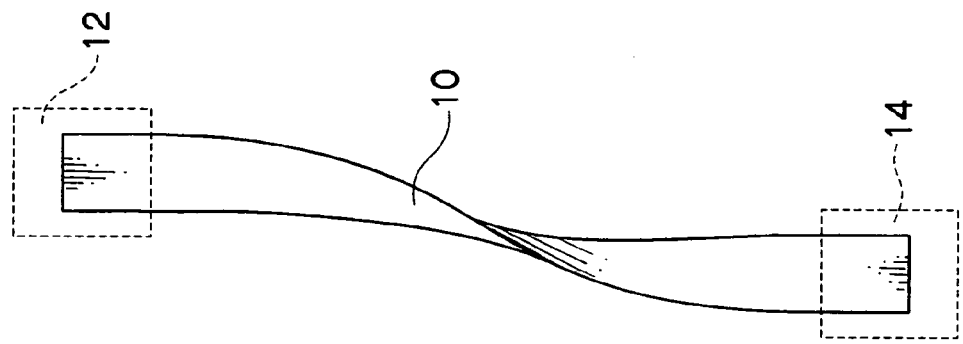
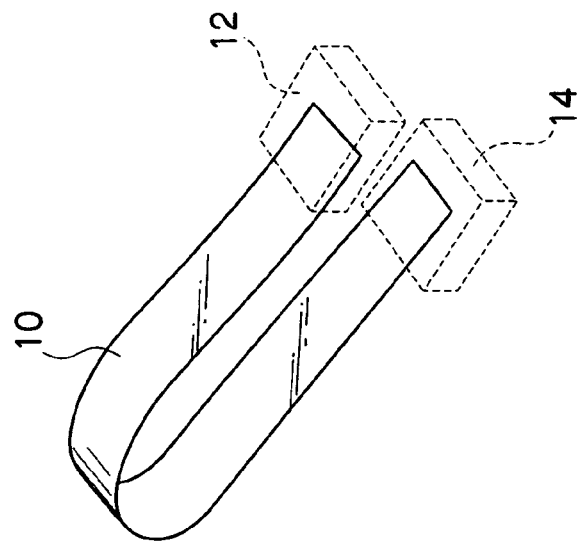

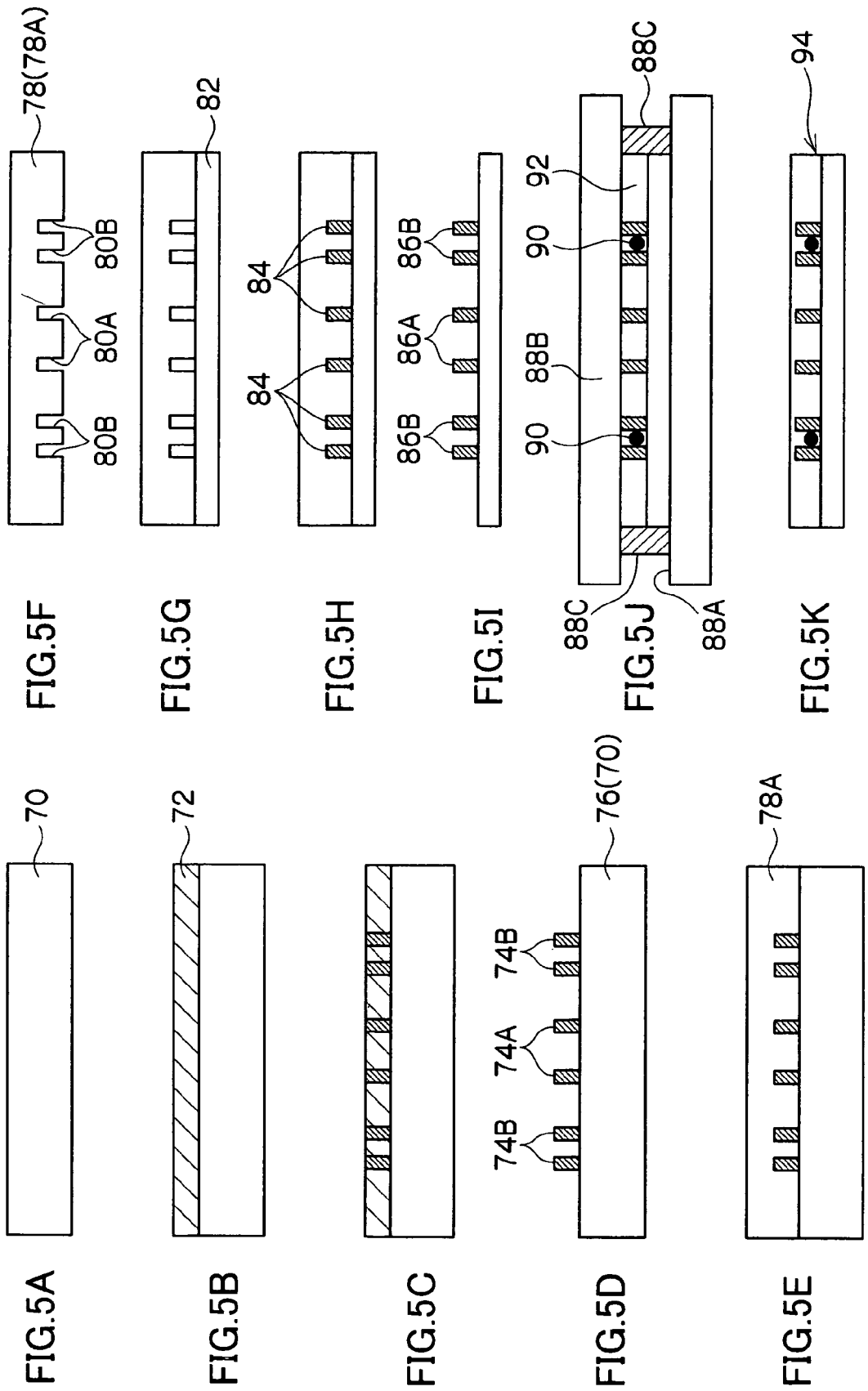

OPTICAL WAVEGUIDE FILM, AND LIGHT TRANSMISSION AND RECEPTION MODULE

CROSS-REFERENCE TO RELATED APPLICATION

This application claims priority under 35 USC119 from Japanese patent document, No. 2005-214925, the disclosure of which is incorporated by reference herein.

BACKGROUND OF THE INVENTION

1. Field of the Invention

The present invention relates to an optical waveguide film that guides light as waveguide light and a light transmission and reception module using the film, that is used for mobile appliance.

2. Description of the Related Art

Examples of an optical waveguide film producing method include: (1) a method of impregnating films with monomer, selectively exposing cores and changing reflectance so as to laminate films (selective polymerization); (2) a method of applying a core layer and a cladding layer so as to form a cladding portion using reactive ion etching (RIE method); (3) a method using a lithography method of performing exposure and development using an ultraviolet curable resin where a photosensitive material is added to a macromolecular material (direct exposing method); (4) a method using injection; and (5) a method of applying a core layer and a cladding layer, exposing a core portion so as to change reflectance of the core portion (photo-breaching method).

However, the selective polymerization (1) has a problem of lamination, the cost is expensive in the methods (2) and (3) as the photolithography method is used, and an obtained core diameter may be inaccurate in the method (4). The method (5) cannot obtain sufficient difference in reflectance between the core layer and the cladding layer.

At present, only the methods (2) and (3) are practical with excellent performance, but the cost is expensive. In addition, all the methods (1) to (5) cannot be applied to formation of a macromolecular waveguide on a flexible plastic base material with a large area.

A waveguide copying technique, which is proposed by the present inventors, uses a micromold method to which the lithography technique is applied. With this method, a macromolecular waveguide can be simply copied on a flexible plastic base material with a large area, and thus this method has excellent mass productivity.

Recently, optical wiring is noted in order to improve an operating speed and an integration degree in IC technique and LSI technique. The optical wiring is realized between devices, between boards and between chips in the devices instead of electric wiring with high density. A flexible optical waveguide substrate is proposed in order to realize the optical wiring.

In Japanese Patent Application Laid-Open (JP-A) No. 4-281406, for example, after a reinforcing member is formed on a base material, an optical waveguide film is formed thereon, and the base material is removed selectively except for a portion which is desired to be reinforced so that a flexible optical waveguide with the reinforced portion is formed.

JP-A No. 2000-235127 describes a photoelectronic integrated circuit where a macromolecular optical waveguide circuit is assembled directly on a photoelectric fusion circuit board where electronic elements and optical elements are integrated.

When the above elements are packaged in the optical wiring and can be incorporated into a device, the assembling flexibility of the optical wiring can be increased. As a result, a compact device can be manufactured.

On the other hand, as a structure where a power supply wire is provided to an optical fiber, JP-A No. 2005-37592 discloses an example where a power is supplied by using a metal loading optical fiber.

The optical waveguide proposed in JP-A No. 2005-37592 or the like is, however, mostly operated as a stand-alone optical waveguide, and an optical waveguide where electric wiring for supplying a power to a mobile appliance and an optical waveguide are included is not proposed yet.

The present invention provides an optical waveguide film which enables a power supply at an extremely low cost, and a light transmission and reception module using this film.

SUMMARY OF THE INVENTION

A first aspect of the present invention is an optical waveguide film comprising a waveguide core that extends in a film length direction and guides light as waveguide light, a conductor for power supply that extends in the film length direction and is provided in parallel with the waveguide core; and a cladding that surrounds the waveguide core and the conductor.

According to this aspect, the conductor for power supply is provided so as to be adjacent to the waveguide core and is surrounded by the cladding so as to be integrally molded. The optical waveguide film which can supply a power at an extremely low cost can be obtained.

A second aspect of the present invention is a light transmission and reception module comprising an optical waveguide film formed with an optical waveguide, a light transmitting section that has a light emitting element and a sub-mount for holding the light emitting element and holds one end of the optical waveguide film onto the sub-mount so that light emitted from the light emitting element is coupled with an incident end surface of the optical waveguide, and a light detecting section that has a light detecting element and a sub-mount for holding the light detecting element, and holds the other end of the optical waveguide film onto the sub-mount so that light emitted from an emission end surface of the optical waveguide is detected by the light detecting element.

According to this aspect, the light transmission and reception module using the optical waveguide film and enabling the power supply can be provided at a low cost.

BRIEF DESCRIPTION OF THE DRAWINGS

Embodiments of the present invention will be described in detail based on the following figures, wherein:

FIGS. 2A and 2B are diagrams illustrating follow-up property of the light transmission and reception module with respect to a deformation according to the embodiment;

FIGS. 5A to 5K are diagrams illustrating the concrete steps of manufacturing the macromolecular optical waveguide film of the light transmission and reception module according to the embodiment;

DETAILED DESCRIPTION OF THE INVENTION

An embodiment of the present invention is explained in detail below with reference to the drawings.

Light Transmission and Reception Module

Figure 1:
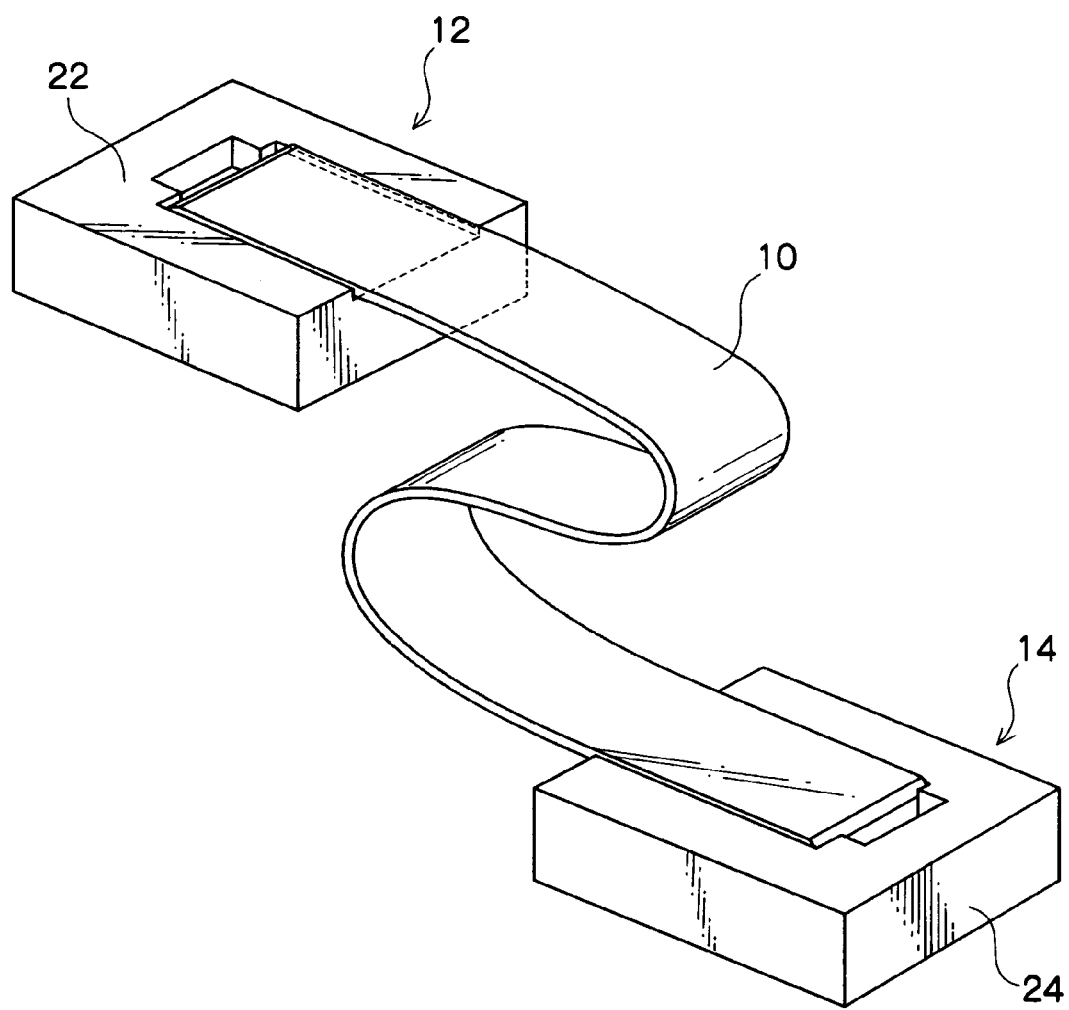
FIG. 1 is a schematic structural diagram illustrating a light transmission and reception module according to an embodiment of the present invention.

FIG. 1 is a schematic structural diagram of light transmission and reception module in the embodiment. As shown in FIG. 1, the light transmission and reception module is composed of a belt-shaped macromolecular optical waveguide film 10 and optical transmission and reception sections 12, 14 for transmitting and receiving an optical signal through an optical waveguide formed in the macromolecular optical waveguide film 10.

The optical transmission and reception section 12 has a sub-mount 22, and one end of the macromolecular optical waveguide film 10 is held on the sub-mount 22. The optical transmission and reception section 14 has a sub-mount 24, and the other end of the macromolecular optical waveguide film 10 is held on the sub-mount 24.

The macromolecular optical waveguide film 10 is made of a transparent resin film having flexibility and has follow-up property with respect to deformation such as "bending" or "distortion" as shown in FIGS. 2A and 2B. Accordingly, even in a state that the film is deformed, an optical signal transmitted from the optical transmission and reception section 12 is guided through an optical waveguide formed in the macromolecular optical waveguide film 10, and is received by the optical transmission and reception section 14. The macromolecular optical waveguide film 10 is preferably has flexibility such that a bending radius is 3 mm or less. The bending radius is a value representing a radius of a circle when a very small portion of a curve formed on the inside of a bent film is approximated to the circle, and its permissible value is measured based on ASTM D-2176. A resin material to be used for the macromolecular waveguide film 10 is mentioned later.

The macromolecular optical waveguide film 10 is preferred to have a thickness in a range of 50 μm to 300 μm in order to enhance the follow-up property to deformation, and a more preferable range is 100 μm to 200 μm. For the same reason, the width of the film is preferred to be in a range of 0.5 mm to 10 mm, or more preferably 1 mm to 5 mm.

Macromolecular Optical Waveguide Film.

Figure 3A:
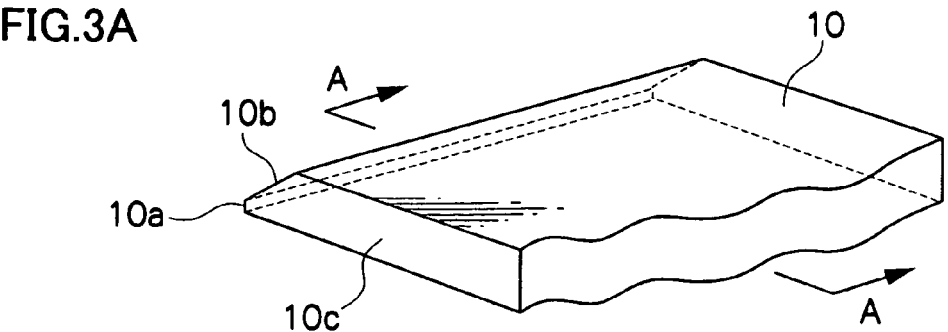
FIG. 3A is a perspective view illustrating an end of a macromolecular optical waveguide film in the light transmission and reception module according to the embodiment.
Figure 3B:
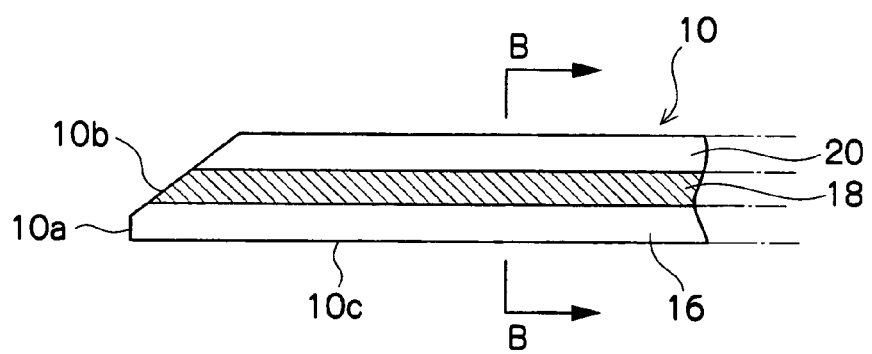
FIG. 3B is a sectional view of A—A of FIG. 3A.
Figure 3C:
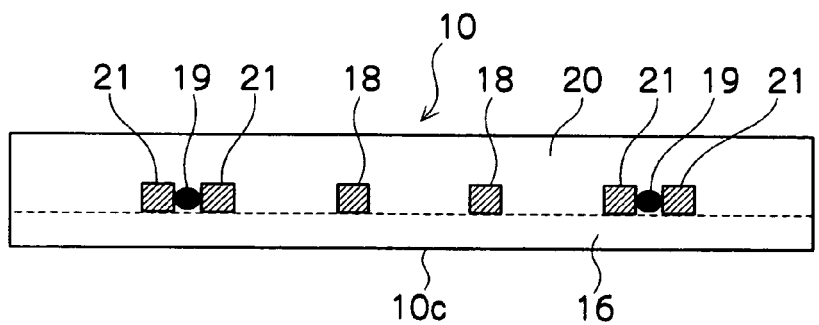
FIG. 3C is a sectional view of B—B of FIG. 3B.
Figure 3D:
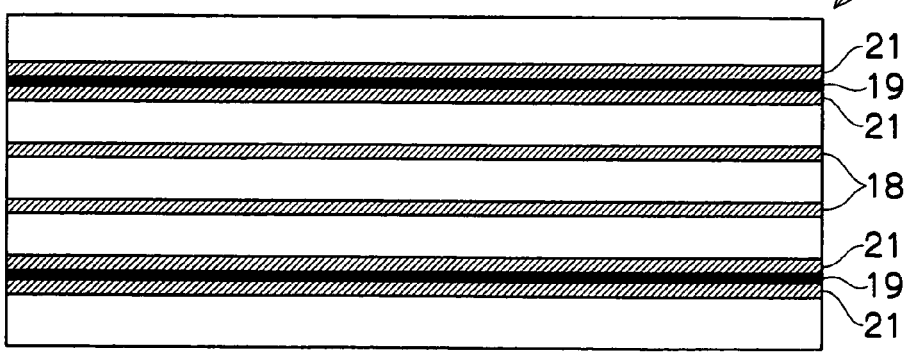
FIG. 3D is a plan view of the macromolecular optical waveguide film.

With referring to FIGS. 3A to 3D, the configuration of the macromolecular optical waveguide film 10 will be described. FIG. 3A is a perspective view of an end portion of the macromolecular optical waveguide film 10, FIG. 3B is a sectional view of A—A (section along optical axis of optical waveguide) of FIG. 3A, FIG. 3C is a sectional view of B—B of FIG. 3A, and FIG. 3D is a plan view of the macromolecular waveguide film 10.

As shown in the drawing, the macromolecular optical waveguide film 10 is composed of square cores 18 extending in film length direction, square power supply wires 19 extending in film length direction and provided in parallel with the waveguide cores, and cladding 16 and 20 surrounding the cores 18 and the power supply wires 19. In the macromolecular optical waveguide film 10, plural cores 18 are disposed parallel in the film width direction and plural optical waveguides are formed in the film. In this example, two optical waveguides are formed in the film 10.

The two power supply wires 19 are arranged in parallel with the film width direction so as to sandwich the plural cores 18. The two power supply wires 19 are provided so as to be held between a pair of position regulating portions 21 extending in the film length direction. That is to say, two pairs of the position regulating portions 21 are disposed. The position regulating portions 21 are installed together on both ends in the film width direction with respect to the cores 18, and the power supply wires 19 are provided in the gaps between the regulating portions. The position regulating portions 21 are made of the same material as the cores 18 and their sectional shape is square. The position regulating portions 21 facilitate locating of the power supply wires 19 and prevent distortion and shift of the power supply wires 19 due to impact so as to improve reliability. When the same composing material as that of the cores 18 is used for the position regulating portions 21, the production cost can be reduced.

At the end of the macromolecular optical waveguide film 10, a mirror 10b is disposed at an angle of 45 degrees to the optical axis of optical waveguide. The mirror 10b functions as optical path converter for converting the optical path of the light guided in the optical waveguide. That is, the light guided in the optical waveguide has an optical path thereof changed by 90 degrees on the mirror 10b and is emitted from the film side 10c of the light incident and exit surface. The leading end of the cladding 16 forming the mirror 10b is cut off and an abutting surface 10a orthogonal to the optical axis of optical waveguide is formed. The abutting surface 10a is a surface abutting against the sub-mount and is utilized in positioning on the sub-mount at the time of mounting. Respective end of the power supply wires 19 is exposed at the mirror 10b.

The macromolecular optical waveguide film 10 can be manufactured, for example, in the following steps (1) to (7): (1) a step of preparing a mold formed of a cured layer of curable resin for forming a mold, having recesses corresponding to the optical waveguide core portions and recesses corresponding to the positioning projections for the power supply wires, and two or more through-holes each penetrating through both ends of the respective recess, (2) a step of tightly adhering a plastic film base material for cladding to the mold, the plastic film is capable of contacting tightly with the mold, (3) a step of filling the through-hole at one end of the respective recess of the mold with a curable resin for forming a core and evacuating and sucking from the through-hole at the other end of the respective recess resulting in each recess of the mold filled with the curable resin, (4) a step of curing the filled curable resin for forming a core, and separating the mold from the plastic film base material for cladding, (5) a step of providing the power supply wires between the position regulating portions formed on the plastic film base material for cladding, (6) a step of forming a cladding layer on the plastic film base material on which the cores, the power supply wires, and the position regulating portions are formed, and (7) a step of forming the 45-degree mirror and the abutting surface at the end of the obtained macromolecular optical waveguide film.

Figure 4A:
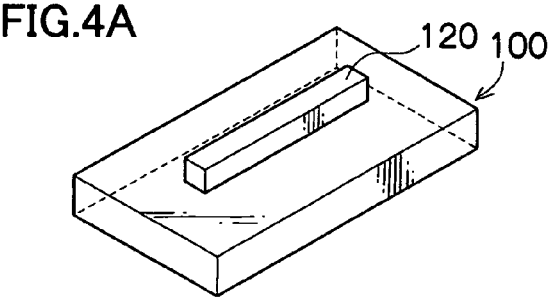
FIGS. 4A to 4I are diagrams illustrating the steps of manufacturing a waveguide core of the macromolecular optical waveguide film in the light transmission and reception module according to the embodiment.
Figure 4B:
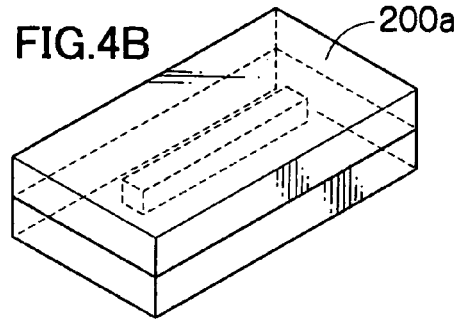
Figure 4C:
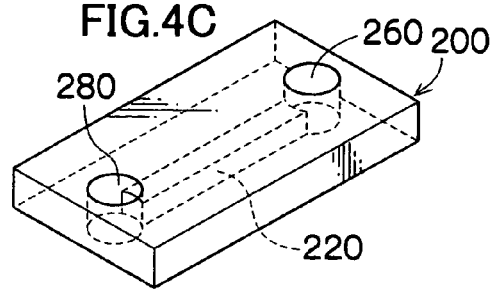

With reference to FIGS. 4A to 4I, a summary of the steps of manufacturing the macromolecular optical waveguide film provided with one optical waveguide (core) is explained. The position regulating portions of the power supply wires which are made of the same material as that of the optical waveguide can be formed at the similar steps. FIG. 4A illustrates a master plate 100 and a projection 120 corresponding to the core (the position regulating portion of the power supply wire) of the optical waveguide. Curable resin for forming a mold is applied or cast on the projection formed surface of the master plate 100 and the resin is cured (see FIG. 4B). A curable resin layer 200a is indicated in FIG. 4B. When the curable resin layer 200a is separated from the master plate 100, the curable resin layer 200a formed with a recess can be obtained (not shown). Through-holes 260 and 280 penetrating through the recess 220 are formed on the curable resin layer 200a by blanking both ends of the recess so that a mold 200 (see FIG. 4C) is obtained.

Figure 4D:
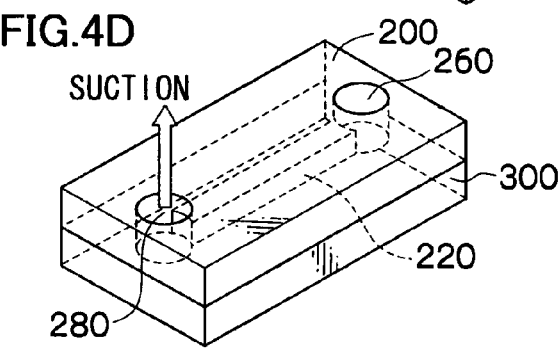
Figure 4E:
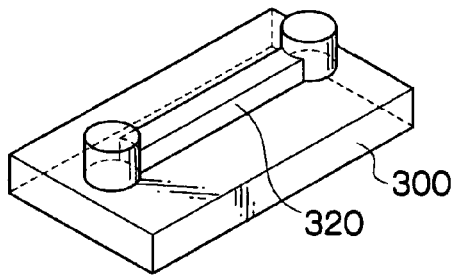
Figure 4F:
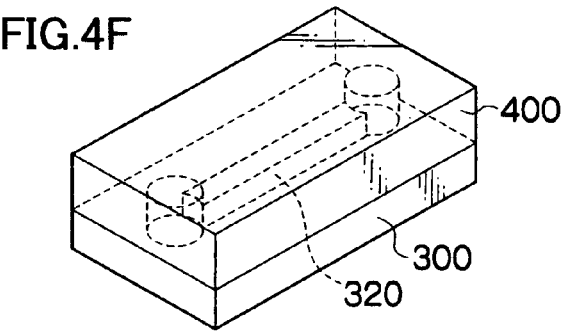

As shown in FIG. 4D, a plastic film base material for cladding 300 is adhered to the mold. A curable resin for forming a core is poured into the through-hole 260 at the one end of the mold recess 220. The mold recess 220 is filled with the curable resin for forming a core by evacuating and sucking from the through-hole 280 at the other end of the mold recess 220. After the resin is cured, the mold is parted and a core 320 is formed on the plastic film base material for cladding 300 as shown in FIG. 4E.

Figure 4G:
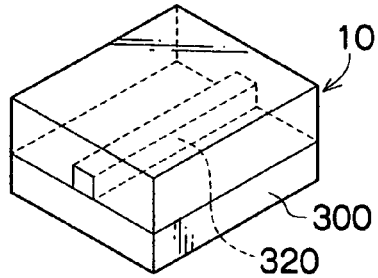

Forming a cladding (upper cladding layer) 400 (see FIG. 4F), the resin portions cured inside the through-holes 260 and 280 are cut off by a dicer or the like, and a macromolecular optical waveguide film 10 is obtained (see FIG. 4G).

Figure 4H:
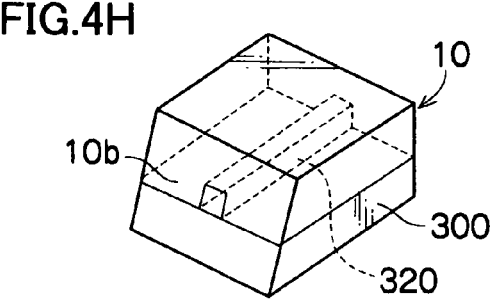
Figure 4I:
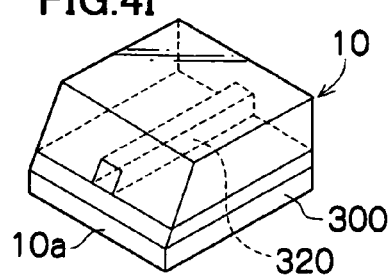

Finally, using a dicing saw having a 45-degree angle blade, the end of the macromolecular optical waveguide film 10 is diced, and a 45-degree mirror 10b is formed at the end of the film 10 (see FIG. 4H). Further, using the dicing saw, the leading end of the 45-degree mirror is cut off at right angle with respect to the longitudinal direction of macromolecular optical waveguide film by a specified length including only the cladding portion, whereby an abutting surface 10a is formed (see FIG. 4I).

An example of the method of manufacturing the optical waveguide film according to the present invention is explained by following the steps with reference to FIGS. 5A to 5K. FIGS. 5A to 5K are sectional views of the optical waveguide film and sequentially illustrate the steps of manufacturing the optical waveguide for two-way communication.

A glass substrate 70 with thickness of 0.7 mm is prepared (see FIG. 5A). A resist 72 with thickness of 50 μm is formed on the glass substrate 70 (see FIG. 5B). The resist 72 is subject to pattern exposure (see FIG. 5C) and development so that the glass substrate 70 having projections 74A corresponding to the waveguide cores and projections 74B corresponding to the position regulating portions of the power supply wires is obtained. The both projections 74A and 74b are composed of the resist (see FIG. 5D). A master plate 76 is formed in such a manner.

Curable resin for forming a mold (for example, PDMS) is applied or cast to the projection formed surface of the master plate 76 and is cured so that a cured resin layer 78A is formed (see FIG. 5E). When the cured resin layer 78A is separated from the master plate 76, recesses are formed on the cured resin layer 78A. A mold 78, which is formed with recesses 80A corresponding to the core projections and recesses 80B corresponding to the position regulating projections of the power supply wires is obtained (see FIG. 5F). The through-holes (not shown) for pouring curable resin for forming a core are formed on the mold 78 so as to penetrate the both ends of the respective recesses.

A plastic film base material for cladding 82 is adhered to the recess formed surface of the mold 78 (see FIG. 5G). The curable resin for forming core is poured into the through-holes (not shown) formed on the mold 78, and the recesses of the mold are filled with the curable resin for forming core 84 by evacuating and sucking from the opposed through-holes with respect to the resin poured through holes. The resin is cured (see FIG. 5H). The mold 78 is separated, two cores 86A and two pairs of position regulating portions 86B which sandwich the cores 86A are formed on the plastic film base material 82 for cladding (see FIG. 5I).

After a power supply wire 90 is provided to a respective gap between the paired position regulating portions 86B, the plastic film base material for cladding 82 formed with the cores 86A and the position regulating portions 86B are fixed by a fixing jig 88A and is simultaneously held by a transparent substrate 88B (glass substrate) formed with a mold release layer via spacers 88C. A gap between the fixing jig 88A and the transparent substrate 88B is filled with, for example, the curable resin for cladding 92, and the resin is cured (see FIG. 5J).

The fixing jig 88A, the transparent substrate 88B and the spacers 88C are removed and both ends of the film are diced by a 45-degree angle dicing saw (not shown). 45-degree mirrors 10b and abutting surfaces 10a are formed on the both end surface of the optical waveguide film 10 (see FIG. 4I), so that an optical waveguide film 94 is obtained (see FIG. 5K).

The each step of forming the macromolecular optical waveguide film 10 is specifically explained below.

(1) A Step of Preparing a Mold

Preferably, the mold is prepared by using a master plate having projecting portions corresponding to the optical waveguide cores and projections corresponding to the position regulating portions of the power supply wires, but it is not limited to this. A method of using a master plate is explained below.

(Production of Master Plate)

To produce the master plate having projecting portions, a conventional method, for example, photolithography can be used without any limitation. Also the method previously proposed by the present applicant for producing a macromolecular optical waveguide by electrodeposition or photoelectrodeposition (Japanese Patent Application No. 2002-10240) is also applicable for production of the master plate.

The size of projecting portions corresponding to the optical waveguide formed in the master plate is determined properly depending on the application of the macromolecular optical waveguide. For example, in the case of optical waveguide for single mode, a core of about 10 μm square is generally used, or in the case of optical waveguide for multimode, a core of about 50 to 100 μm square is used, and depending on the applications, an optical waveguide having much larger core of about hundreds of μm may be used. The position regulating portion of the power supply wire is formed in the magnitude similar to that of the core.

(Production of Mold)

As an example of production of mold, a layer of curable resin for forming a mold is formed on the projecting portion formed surface of the master plate produced as mentioned above by applying or pouring the curable resin for forming a mold thereon. The layer is dried and cured as required, then the cured resin layer is separated from the master plate and a die having recesses corresponding to the projecting portions are formed. The through-holes each communicating from one end to the other end of the recess are formed in the die. The through-holes can be formed by punching the die in a specified shape. Even if the through-holes are formed by punching, the contact tightness between the mold and the film base material for cladding is excellent so that no gap to the film base material for cladding is formed except for the recess of the mold. Accordingly, the curable resin for forming a core will not permeate into other portion than the recesses.

The thickness of the die (resin cured layer) is properly determined in consideration of handling capability of the mold, but generally it is suitably set to be about 0.1 to 50 mm. Preferably, the master plate should be preliminarily coated with releasing agent or the like to facilitate releasing from the mold.

The through-hole provided at a supply side of the curable resin for forming a core functions as a reservoir for liquid (curable resin for forming a core). The through-hole provided at a discharge side of the resin is used for evacuation and suction to evacuate the recess so that the recess is filled with the resin. The shape and size of the supply side through-hole are not particularly specified as far as the through-hole communicates with the supply side of the recess and functions as the liquid reservoir. The shape and size of the discharge side through-hole are not particularly limited as long as the through-hole communicates with the discharge end of the recess and can be used for evacuating and sucking.

A section of the through-holes are preferably formed to be made larger at the side contacting with the base material for cladding and smaller as away from the base material, so that it is easier to separate the mold and base material after filling the recess with the curable resin for forming a core and curing.

As other example of producing the mold, the master plate is provided not only with projecting portions corresponding to the optical waveguide cores and the position regulating portions of the power supply wires, but also with projecting portions for forming through-holes (the height of the projecting portions are higher than the thickness of the cured layer of curable resin for forming a mold), and the curable resin for forming a mold is applied to the master plate so that the projecting portions for forming the through-holes poke through the resin layer. After the resin layer is cured, the cured resin layer is separated from the master plate.

The curable resin for forming a mold is required to have appropriate properties, including ease of peeling of the cured matter from the master plate, sufficient mechanical strength and dimensional stability as mold (to be used repeatedly), stiffness (hardness) for retaining the recess shape, and adhesion to the film base material for cladding. As required, various additives may be added to the curable resin for forming a mold.

The curable resin for forming a mold can be applied or poured to the surface of the master plate and is required to copy accurately the projecting portions corresponding to the individual optical waveguide cores and the position regulating portions of the power supply wires formed on the master plate. Therefore, it is preferred to have viscosity below a certain limit, for example, about 500 to 7000 mPa·s. (The curable resin for forming a mold used in the invention includes a material becoming elastic rubber like body after curing.) For control of viscosity, a solvent may be added slightly so as not to cause adverse effects of the solvent As the curable resin for forming a mold, a curable organopolysiloxane, which becomes silicone rubber (silicone elastomer) or silicon resin after curing is preferably used from the viewpoint of releasing property, mechanical strength and dimensional stability, hardness and adhesion with base materials for cladding as stated above. The curing organopolysiloxane is preferred to contain methyl siloxane group, ethylene siloxane group, or phenyl siloxane group in its molecule.

The curing organopolysiloxane may be either one-pack type or two-pack type to be used together with hardener, or may be either hot curing type or cold curing type (for example, cured by moisture in air). Or other hardener (ultraviolet curing agent) may be also used.

The curable organopolysiloxane is preferred to become silicone rubber after curing. So-called liquid silicone rubber can be used (the term "liquid" includes paste or highly viscous substances herein) and the two-pack type to be used together with hardener is preferred. Above all, the addition type liquid silicone rubber is especially preferred because it is cured in short time uniformly both on surface and inside thereof, free from byproducts or produce few byproducts, and excellent in releasing property and small in shrinkage rate.

Among liquid type silicone rubbers, liquid dimethyl cyclohexane rubber is particularly preferable from the viewpoint of adhesion, separation, strength and hardness. The cured substance of liquid dimethyl cyclohexane rubber is generally low in refractive index of about 1.43, and a mold made from this substance can be preferably used as cladding layer directly, which does not cause separation from the base material for cladding. In this case, it is required to have proper means for prevent peeling of applied core forming resin and base material for cladding from the mold.

The viscosity of liquid silicone rubber is preferably about 500 to 7000 mPa·s, or more preferably about 2000 to 5000 mPa·s, from the viewpoint of accurate copying of projecting portions corresponding to the optical waveguide cores and the position regulating portions of the power supply wire, ease of defoaming by limiting entry of foams, and obtaining mold size of several millimeters in thickness.

A surface energy of the mold is in a range of 10 dyn/cm to 30 dyn/cm, preferably 15 dyn/cm to 24 dyn/cm from the viewpoint of the adhesion with the base material film. The surface energy is measured by a method of measuring a critical surface tension using a Zisman method. Share rubber hardness of the mold is 15 to 80, or preferably 20 to 60 from the viewpoint of profiling performance, maintenance of the recess shape and separation. The share rubber hardness can be measured according to JIS K 6253 by using a durometer.

A surface roughness of the mold (an arithmetic mean roughness Ra) is 0.2 μm or less, or preferably 0.1 μm or less from the viewpoint of profiling performance. The arithmetic mean roughness Ra can be measured according to JIS B 0601.

The mold is preferred to be light transmittable in ultraviolet ray region and/or visible ray region. When the mold is light transmittable in visible ray region, positioning is easier when adhering the mold to the film base material for cladding at step (2) below, and filling of mold recess with curable resin for forming a core can be observed at step (3) so that completion of filling can be easily known.

When the mold is light transmittable in ultraviolet ray region, ultraviolet curing is to be achieved by transmitting ultraviolet through the mold in case that ultraviolet curable resin is used to form a core. Preferably, the transmittance of the mold in ultraviolet ray region (250 nm to 400 nm) is 80% or more.

The curable organopolysiloxane, in particular, liquid silicone rubber which becomes silicone rubber after curing is excellent in both of the contradictory properties of adhesion and separation with respect to the film base material for cladding and has a capability of copying nano configuration, and also works to prevent entry of liquid when silicone rubber and cladding base material are adhered.

As the mold using such silicone rubber copies the master plate accurately and adheres to the cladding base material, it fills only the recess between the mold and cladding base material efficiently with the core forming resin, and the mold can be separated easily from the cladding base material. Therefore, macromolecular optical waveguides retaining the configurations thereof at high precision can be produced very easily.

(2) A Step of Tightly Adhering a Plastic Film Base Material for Cladding to the Mold Since an optical device (a light transmission and reception module) produced from the macromolecular optical waveguide of the invention is used in optical wiring in various layers, the material of the plastic film base material for cladding is properly selected in consideration of refractive index, light permeability and other optical characteristics, mechanical strength, heat resistance, adhesion with mold, flexibility and others, depending on the applications of the optical device.

Examples of the film include alicyclic acrylic resin film, alicyclic olefin resin film, triacetic cellulose film, and fluorine containing resin film. The refractive index of film base material is preferably 1.55 or less, or more preferably 1.53 or less, in order to keep enough difference in refractive index from the core.

The alicyclic acrylic resin film is, for example, OZ-1000, OZ-1100 (Hitachi Chemical Co., Ltd.) manufactured by introducing tricyclodecane or other alicyclic hydrocarbon in ester substituent.

The alicyclic olefin resin film is one having norbornene configuration in the main chain, and one having norbornene configuration in the main chain and having polar group such as alkyl oxycarbonyl group (alkyl group having 1 to 6 carbon atoms or cycloalkyl group) in the side chain. Above all, the alicyclic olefin resin having norbornene configuration in the main chain and having polar group such as alkyloxycarbonyl group in the side chain as mentioned above is particularly suited to production of optical waveguide sheet of the invention because it is excellent in optical characteristics, having low refractive index (refractive index being about 1.50, assuring a sufficient difference in refractive index between core and cladding) and high light permeability, excellent in adhesion to the mold, and excellent in heat resistance.

A thickness of the film base material is properly selected in consideration of flexibility, rigidity and ease of handling, and is generally about 0.1 mm to 0.5 mm.

(3) A Step of Filling a Curable Resin for Forming a Core in the Recess of the Mold At this step, the through-hole provided at the supply side of the resin is filled with curable resin for forming a core, and by evacuating and sucking through the through-hole provided at the discharge side of the resin, the gap (i.e., the recess of the mold) formed between the mold and the film base material for cladding is filled with the resin. By evacuating and sucking, the adhesion of the mold and the film base material for cladding is enhanced, and entry of foams can be avoided. For evacuating and sucking, a suction pipe connected to a pump is inserted into the through-hole at the discharge side.

The curable resin for forming a core includes resins of radiation curing type, electron curing type and heat curing type, and above all the ultraviolet curable resin and thermosetting resin are preferably used. As the ultraviolet curable resin and thermosetting resin for forming a core, ultraviolet curing type and thermosetting type monomer, oligomer, or mixture of monomer and oligomer may be preferably used. Ultraviolet curable resins of epoxy system, polyimide system, and acrylic system may also be preferably used.

The curable resin for forming a core is filled in gaps (the recess of mold) formed between the mold and the film base material by capillarity, and the curable resin for forming a core is required to be sufficiently low in viscosity for realizing such filling. Therefore, the viscosity of the curable resin is 10 mPa·s to 2000 mPa·s, preferably 20 mPa·s to 1000 mPa·s, or more preferably 30 mPa·s to 500 mPa·s.

Besides, in order to reproduce the original shape of the projecting portion corresponding to the optical waveguide core formed on the master plate at high precision, it is important that the volume change is small before and after curing of the curable resin. For example, decrease in volume leads to conduction loss. Therefore, the curable resin for forming a core is desired to be small in volume change as far as possible, for example, 10% or less, or preferably 6% or less. It is recommended to avoid lowering of viscosity by using a solvent as the volume change becomes large before and after curing.

To reduce the volume change (shrinkage) after curing of the resin, a polymer may be added to the resin. Such a polymer is preferred as being compatible with curable resin for forming a core, not having adverse effects on the resin refractive index, elasticity or permeability. By adding the polymer, not only the volume change can be decreased, but also it is effective to control the viscosity or glass transition point of the cured resin at an advanced level. The polymer includes acrylic system, methacrylic system, epoxy system, and many others.

The refractive index of the cured matter of curable resin for forming a core is required to be larger than that of the film base material as the cladding (including the cladding layer in step (5) below), and is 1.50 or more, preferably 1.53 or more. The difference in refractive index between the cladding (including the cladding layer in step (5) below) and the core is 0.01 or more, preferably 0.03 or more.

(4) A Step of Curing the Applied Curable Resin for Forming a Core and Separating the Mold from the Film Base Material for Cladding At this step, the applied curable resin for forming a core is cured. To cure the ultraviolet curable resin, ultraviolet lamp, ultraviolet LED, UV irradiation equipment or the like is used, and to cure the thermosetting resin, it is heated in an oven or the like.

The mold used at steps (1) to (3) may be directly used as the cladding layer as far as the conditions such as refractive index are satisfied, and in such a case, separation of the mold is not required. In this case, it is preferred to treat the mold in ozone in order to enhance the adhesion between the mold and core material.

(5) A Step of Providing Power Supply Wires Between Position Regulating Portions Formed on the Plastic Film Base Material for Cladding A metallic wire made of metal or alloy is provided between the position regulating portions formed on the plastic film base material for cladding, or conducting paste is applied so that the power supply wire is formed so as to be held between the respective paired position regulating portions. In particular, when the power supply wire is formed by the conducting paste, the power supply wire can be formed into a linear shape more easily with having more excellent adhesion with the other members than the case where the metallic wire is applied.

A material of the metallic wire can be selected from copper, iron, nickel, gold, aluminum and alloy of these metals. The conducing paste can be obtained by dispersion at least one kind of metallic power selected from copper, iron, nickel, gold, aluminum and alloy of these metals in resin binder. The use of these materials realizes excellent power supply.

A diameter of the power supply wire is nearly the core diameter of the optical waveguide, and preferably in a range of 3 μm to 200 μm, or more preferably 10 μm to 100 μm, or still more preferably 30 μm to 80 μm. When the diameter is in the above range, the satisfactory power supply can be realized. The diameter here represents a maximum diameter.

(6) A Step of Forming a Cladding Layer on the Plastic Film Base Material for Cladding A cladding layer is formed on the film base material on which the cores, the power supply wires and the position regulating portions are formed. The cladding layer to be used may be the film base material for cladding used in above step (2), a layer formed by applying and curing a curable resin for cladding, and a macromolecular film obtained by applying and drying a solvent solution of macromolecular membrane. As the curable resin for cladding, ultraviolet curable resin or thermosetting resin is used preferably, and for example, monomer, oligomer or mixture of monomer and oligomer of ultraviolet curing type or thermosetting type may be used.

To reduce a volume change (shrinkage) after curing of the resin, the resin may be blended with a polymer (for example, methacrylic system, epoxy system), which is compatible with the resin and does not have adverse effects on resin refractive index, elasticity or permeability.

When using a film as cladding layer, an adhesive may be used. The refractive index of the adhesive is desired to be closer to the refractive index of the film. As the adhesive, the ultraviolet curing type resin or thermosetting resin is used preferably. For example, monomer, oligomer or mixture of monomer and oligomer of ultraviolet curing type or thermosetting type may be used. To reduce the volume change (shrinkage) after curing of ultraviolet curable resin or thermosetting resin, the same type polymer added to the cladding layer may be used.

The refractive index of the cladding layer is desired to be 1.55 or less, preferably 1.53 or less in order to assure a sufficient difference in refractive index from the core. From the viewpoint of entrapping the light, the refractive index of the cladding layer is preferred to be similar to the refractive index of the film base material.

(7) A Step of Forming a 45-Degree Mirror and an Abutting Surface on an End Surface of the Obtained Macromolecule Optical Waveguide Film The obtained macromolecular optical waveguide film is constituted so that the 45-degree mirror and the abutting surface are formed on the film end surface by using, for example, a dicing saw. Both the core portion and the power supply wire are exposed from the mirror.

Since the plastic film base material exhibits favorable adhesion to the mold, no gap except for the recess configuration formed in the mold is allowed between the mold and the cladding base material without fixing them by using special means but adhering the plastic film base material for cladding tightly to the mold. Accordingly, the curable resin for curing a core can be provided only in the recess.

Therefore, the manufacturing process is extremely simplified and the macromolecular optical waveguide film can be produced easily. As compared with the conventional method, the macromolecular optical waveguide film can be manufactured at an extremely low cost.

In this manufacturing method, through-holes are provided in the mold and the discharge side of the recess of the mold is evacuated and sucked through the through-holes so that the adhesion of the mold and the film base material is further enhanced, and entry of foams can be avoided. Further, although performing such a simple method, the obtained macromolecular optical waveguide film has small conduction loss and high precision, and can be mounted in various devices.

Sub-Mount and its Manufacturing Method

The sub-mount of the present invention has a recess for embedding and packaging optical parts.

The sub-mount of the invention can be obtained by a manufacturing method comprising the steps of (1) a mold production step for producing a mold for duplication having projections and recesses for copying the surface configuration of a sub-mount, (2) a filling step for filling the produced mold with curing material, (3) a curing step for curing the applied curing material, and (4) a releasing step for separating a copied sub-mount from the mold.

Methods of producing a mold (Step (1) above) include (A) a method by curing liquid silicone rubber on a master plate of the sub-mount, (B) a method by etching a silicon substrate, and (C) a method by casting a metal. The manufacturing method of the sub-mount using the mold produced in the method (A) will be referred to as "the duplication method using silicone resin" hereinafter, and the manufacturing method of sub-mount using the mold produced by the method (B) or (C) will be referred to as "the stamper method" hereinafter.

Duplication Method Using Silicone Resin

Figure 6A:
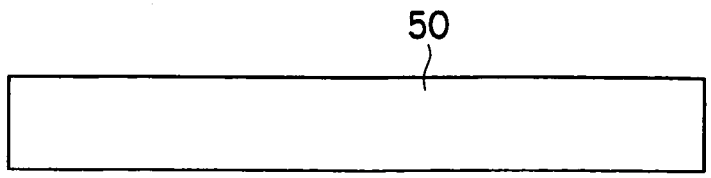
FIGS. 6A to 6F are step diagrams illustrating the steps of manufacturing a sub-mount according to the present invention.
Figure 6B:
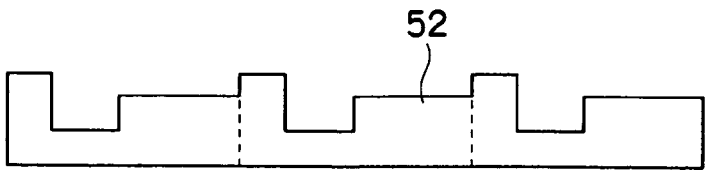

An overall picture of duplication method using silicone resin is explained by referring to FIGS. 6A to 6F. FIG. 6A shows a silicon substrate 50. Projections and recesses are formed on the main surface of the silicon substrate 50 by RIE, and a master plate 52 of a sub-mount is produced (see FIG. 6B). By precision processing technology such as RIE, the master plate 52 of the sub-mount is produced precisely. Projections and recesses corresponding to a plurality of sub-mounts are formed in the master plate, and by using this mater plate, a plurality of the sub-mounts can be copied simultaneously.

Figure 6C:
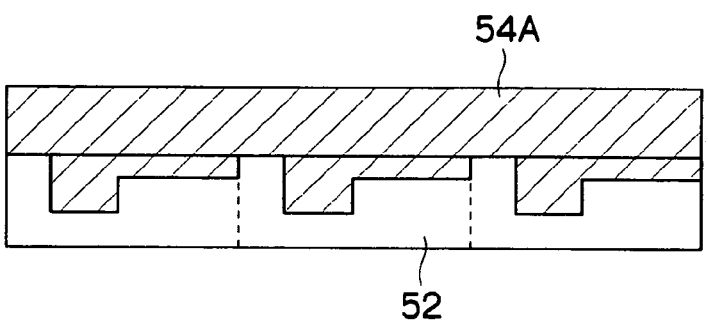
Figure 6D:
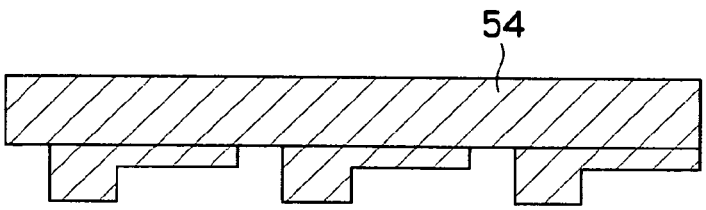

Liquid silicone rubber is applied or poured onto the projection and recess formed surface of the master plate 52, and cured (see FIG. 6C). Then the silicone resin layer 54A is peeled off, and a silicone resin mold 54 having projections and recesses is obtained, in which projections and recesses copy the surface configurations of the sub-mount (see FIG. 6D). Due to the adhering and releasing properties of the liquid silicone rubber, projections and recesses of the master plate 52 are copied accurately. These steps correspond to the mold production step.

Figure 6E:
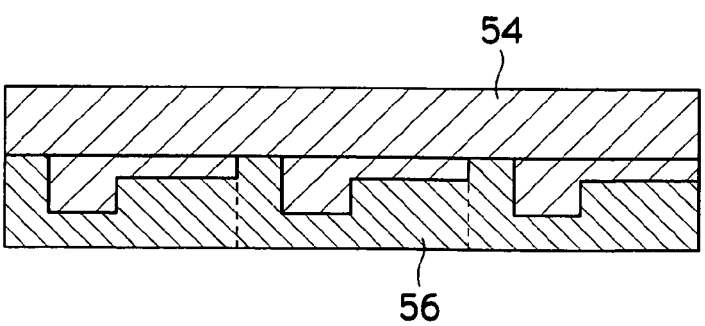
Figure 6F:
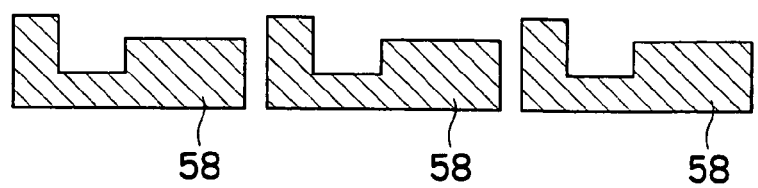

The mold 54 is filled with ultraviolet curable resin and cured by ultraviolet irradiation (see FIG. 6E). These steps correspond to the filling step and curing step. Then, by separating the cured resin layer 56 from the mold 54, projections and recesses of the sub-mount surface are reproduced. This step corresponds to the releasing step. By dicing this duplicate (not shown) into individual sub-mount, sub-mounts 58 of ultraviolet cured resin having projections and recesses on the surface are obtained (see FIG. 6F).

The principal steps of the duplication method using silicon resin are more specifically described below.

(Production of Master Plate)

The above example is for producing the master plate of the sub-mount by etching the silicon substrate by RIE method. However, the material of master plate is not limited to silicon substrate but may be glass substrate such as quartz glass substrate and metal substrate such as nickel (Ni) substrate and the like. For production of the master plate, conventional methods such as photolithography may be employed without any limitation. Moreover, the electrodeposition or photoelectrodeposition previously filed by the present applicant (Japanese Patent Application No. 2002-10240) is also applicable for production of the master plate.

(Production of Mold)

In the duplication method using silicone resin, as mentioned above, liquid silicone rubber is applied or poured onto the projection and recess formed surface of the produced master plate, dried if necessary, and cured, and a silicone resin layer is formed. By separating the silicone resin layer from the master plate, a mold copying the surface configuration of the sub-mount is produced.

The thickness of the silicone resin layer is properly determined in consideration of handling convenience of the mold, but in general it is suitably set to be about 0.1 to 50 mm. Preferably, the master plate should be coated in advance with releasing agent or the like to facilitate releasing from the mold.

The liquid silicone rubber is curing organopolysiloxane, which becomes silicone rubber after curing, and the term "liquid" includes paste or viscous substances. The liquid silicone rubber preferably contains methyl siloxane group, ethyl siloxane group, or phenyl siloxane group in its molecule. Among liquid silicone rubber materials, liquid dimethyl siloxane rubber (polydimethyl siloxane: PDMS) is particularly preferable from the viewpoint of adhesion, releasing property, strength and hardness.

The liquid silicone rubber is excellent in both adhesion and separation, which are contradictory properties, and has a capability of copying fine configuration. Accordingly, the mold using silicone rubber is capable of copying the master plate at high precision, and it is easy to separate the mold from ultraviolet curable resin for forming the sub-mount described later. Advantages of liquid silicone rubber mold include sufficient mechanical strength and dimensional stability as mold (which is to be used repeatedly), and stiffness (hardness) for retaining the projected and recessed configurations. From this mold, therefore, sub-mounts retaining the shape at high precision can be reproduced very easily.

The liquid silicone rubber is preferred to be of two-pack type used together with hardening agent. The addition type liquid silicone rubber is preferred because it is cured uniformly both at the surface and the inside in a short time, free from byproducts or produces few byproducts, is excellent in releasing property and small in shrinkage rate. As required, various additives may be used in the liquid silicone rubber.

Since the liquid silicone rubber can be applied or poured on the surface of the master plate and the projections and recesses formed on the master plate must be copied accurately, the viscosity is preferred to be less than a certain level. The viscosity of the liquid silicone rubber is preferred to be about 500 mPa·s to 7000 mPa·s, or more preferably about 2000 mPa·s to 5000 mPa·s. For adjusting the viscosity, a solvent may be added slightly so as not to express adverse effects of the solvent.

The surface energy of mold is 10 dyn/cm to 30 dyn/cm, preferably 15 dyn/cm to 24 dyn/cm, from the viewpoint of adhesion to the resin. The surface energy can be analyzed by measuring the contact angle between solid and liquid, and hence it is measured by a specified contact angle measuring apparatus. Share rubber hardness of the mold is 15 to 80, preferably 20 to 60, from the viewpoint of patterning performance, retaining of the recess shape and separation. Share rubber hardness can be measured by using spring type rubber durometer for measuring an amount of deformation when a surface of the object is pushed by a needle and made deformed. Surface roughness of mold (maximum height: Ry) is set to be 0.2 μm or less, preferably 0.1 μm (100 nm) or less, from the viewpoint of patterning performance. Surface roughness Ry is a value expressing a maximum height defined by the difference of a maximum value and a minimum value of roughness curve, and can be measured by probe type film thickness gauge.

The mold is preferred to be light transmittable in ultraviolet ray region and/or visible ray region. When the mold is light transmittable in visible ray region, the state of filling the mold with the resin can be observed and completion of filling is easily confirmed. When the mold is light transmittable in ultraviolet ray region, ultraviolet curing is achieved by making ultraviolet transmit through the mold. The transmittance of the mold in ultraviolet ray region (250 nm to 400 nm) is preferred to be 80% or more.

(Duplication of Sub-Mount)

In the duplication method using silicon resin, as mentioned above, the mold copying the surface configuration of the sub-mount is filled with ultraviolet curable resin for forming a sub-mount, the applied resin is cured, and the cured resin layer is separated from the mold, so that a sub-mount forming projections and recesses on the surface can be copied.

As the ultraviolet curable resin for forming a sub-mount, a resin of high heat resistance is preferred, and epoxy based and polyimide based UV curable resins are preferably used. Also, monomer, oligomer, or mixture of monomer and oligomer of ultraviolet curing type may be preferably used.

The ultraviolet curable resin is required to be sufficiently low in viscosity so as to fill up the projections and recesses of the mold. The viscosity of ultraviolet curable resin is preferably 10 mPa·s to 2000 mPa·s, more preferably 20 mPa·s to 1000 mPa·s, and most preferably 30 mPa·s to 500 mPa·s.

To reproduce the projections and recesses formed on the master plate at high precision, it is required that the volume change is small before and after curing of the ultraviolet curable resin. The volume change is preferred to be 10% or less, or more preferably 6% or less. It is preferred to avoid lowering the viscosity by using a solvent because the volume change before and after curing becomes large.

To reduce volume change (shrinkage) after curing of the ultraviolet curable resin, a polymer may be added to the ultraviolet curable resin. The polymer to be added is preferably compatible with the ultraviolet curable resin and dose not have adverse effects on the resin refractive index, elasticity and light-transmitting properties thereof. By adding the polymer, not only the volume change can be decreased, but also the viscosity or glass transition point of the cured resin can be effectively controlled at advanced level. The polymer includes acrylic system, methacrylic acid system, epoxy system, and many others.

To cure the ultraviolet curable resin, light is emitted from ultraviolet ray lamp, ultraviolet ray LED, UV irradiation apparatus, in an ultraviolet region (250 nm to 400 nm).

Stamper Method

Figure 7A:
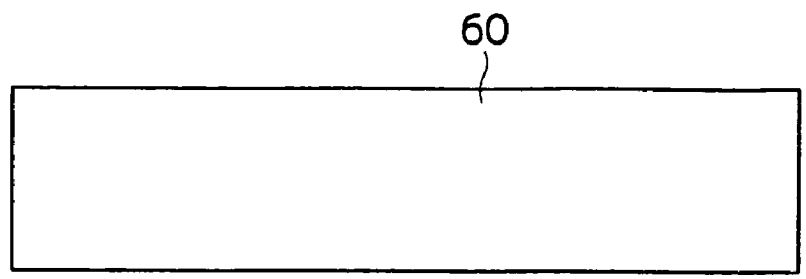
FIGS. 7A to 7D are step diagrams illustrating other steps of manufacturing the sub-mount according to the present invention.
Figure 7B:
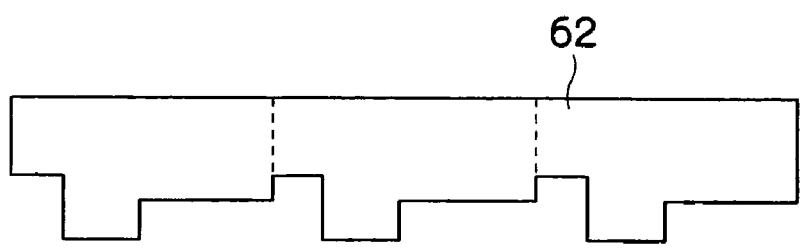

A general picture of the stamper method is explained by referring to FIGS. 7A to 7D. In the stamper method, the mold is used as a stamp. FIG. 7A shows a silicon substrate 60. Projections and recesses are formed on the main surface of the silicon substrate 60 by RIE, and a silicon mold 62 is produced (see FIG. 7B). This mold has projections and recesses copied corresponding to a plurality of sub-mounts, and by using this mold, a plurality of sub-mounts can be reproduced simultaneously. By precision processing technology such as RIE, the mold 62 accurately copying the projections and recesses of the sub-mount can be produced precisely. These steps correspond to the mold production step.

Figure 7C:
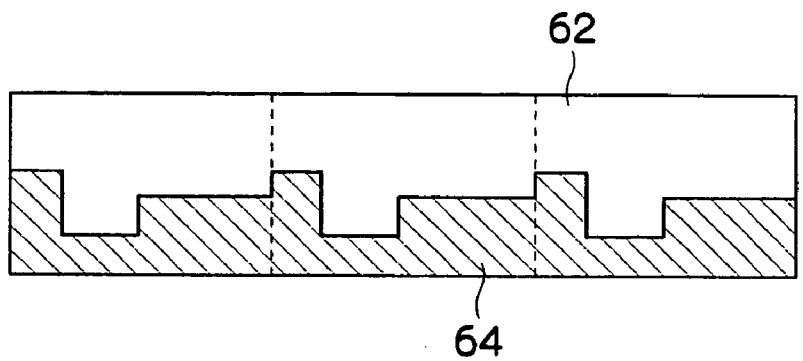
Figure 7D:
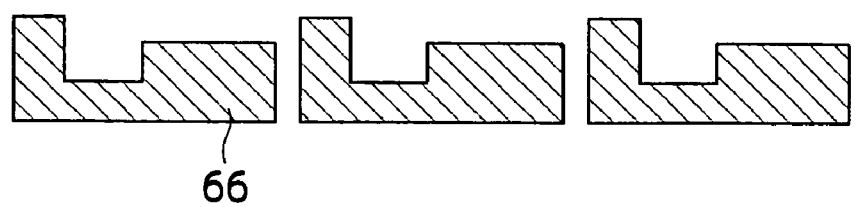

Thermoplastic resin is tightly fitted to the mold 62, heated and pressurized, and cured by being cooled gradually (see FIG. 7C). These steps correspond to the filling step and curing step. Then, by separating the cured resin layer 64 from the mold 62, projections and recesses of the sub-mount surface are reproduced. This step corresponds to the stripping step. By dicing this duplicate (not shown) into individual sub-mount, sub-mounts 66 of thermoplastic resin having projections and recesses on the surface are obtained (see FIG. 7D).

The principal steps of the stamper method are more specifically described below. Hereinafter, in order to distinguish from the mold employed in the duplication method using silicone resin, the mold produced by the Stamper method is herein called the stamper.

(Production of Stamper)

The above example is for producing a stamper by etching a silicon substrate by RIE method. However, the material of the stamper is not limited to silicon substrate, but may be glass substrate such as quartz glass substrate, and metal substrate such as nickel (Ni) substrate. For production of the stamper, conventional methods such as photolithography may be employed without any limitation. The stamper can be produced also by the electrodeposition or photoelectrodeposition previously filed by the present applicant (Japanese Patent Application No. 2002-10240). The production precision of the mold is enhanced by employing photolithography or RIE.

(Duplication of Sub-Mount)

In the stamper method, as mentioned above, the stamper copying the surface configuration of the sub-mount is tightly fitted to thermoplastic resin for forming the sub-mount, heated and pressurized, and slowly cooled to ordinary temperature until cured. By releasing the cured resin layer from the mold, a sub-mount having projections and recesses on the surface can be produced.

The thermoplastic resin for forming the sub-mount is desired to be high in heat resistance, and unsaturated polyester resin-based, epoxy resin-based, polyimide-based, PPS (polyphenylene sulfide)-based thermoplastic resins are, in particular, preferably used. Further, ultraviolet curing monomer, oligomer, or mixture of monomer and oligomer may be used. A resin for precision molding obtained by mixing fillers into thermosetting resin is also used preferably. An example of such resin is BMC resin obtained by mixing fillers such as glass fiber in unsaturated polyester resin so as to suppress shrinkage.

The thermoplastic resin preferably has high dimensional precision with a shrinkage rate of 1% or less, thermal deformation starting temperature of 200 deg. C. or more, is close to metal in coefficient of linear expansion, and is easily combined with metal parts (smaller than in aluminum).

To form projections and recesses on the thermoplastic resin, the thermoplastic resin adhered to the stamper is heated to a temperature about glass transition point (Tg)+50 deg. C., and pressurized at pressure of about 10 N.

In the stamper method, low-melting glass which is molten by heating, such as glass which is softened (molten) at, for example, 600 deg. C. or less can be used instead of thermoplastic resin. The low-melting glass is heated to about 500 deg. C. and a metallic die is used as "stamper", so that a sub-mount made of glass can be reproduced. Even a glass material whose melting point is high, namely, 800 deg. C. such as Pyrex™ is pressurized under heating temperature of about 650 deg. C., the glass material is deformed so that a sub-mount can be reproduced by the stamper method. As the low-melting glass, hard glass mainly containing $SiO_2$ and $B_2O_3$ can be properly applied.

Optical Transmission and Reception Section

Referring to FIGS. 8A to 8C and FIGS. 9A to 9C, a configuration of an optical transmission and reception section 12 having a sub-mount 22 is explained. As a sub-mount 24 is same as the sub-mount 22 in configuration and an optical transmission and reception section 14 is the same as the optical transmission and reception section 12 in configuration, the detailed description of the sub-mount 24 and the optical transmission and reception section 14 will be omitted.

Figure 8A:
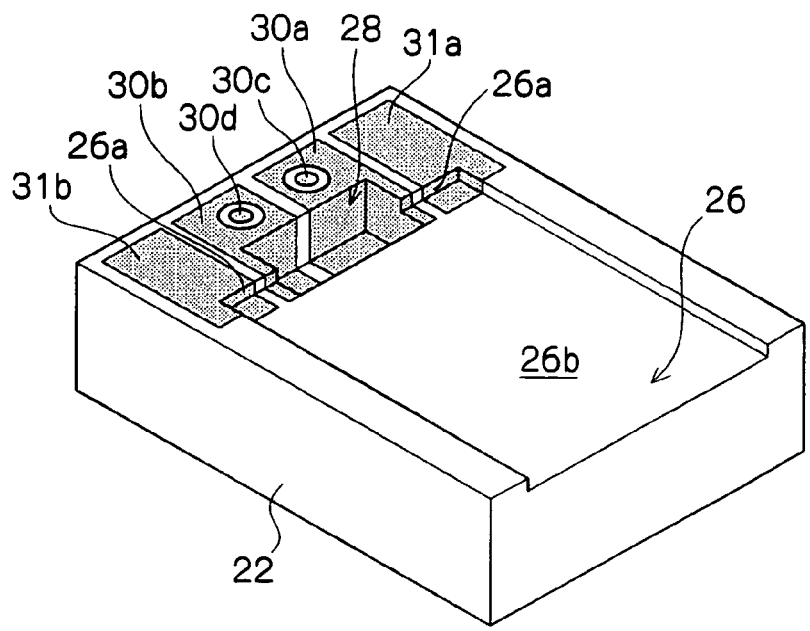
FIG. 8A is a perspective view illustrating the sub-mount of the light transmission and reception module according to the embodiment.
Figure 8B:
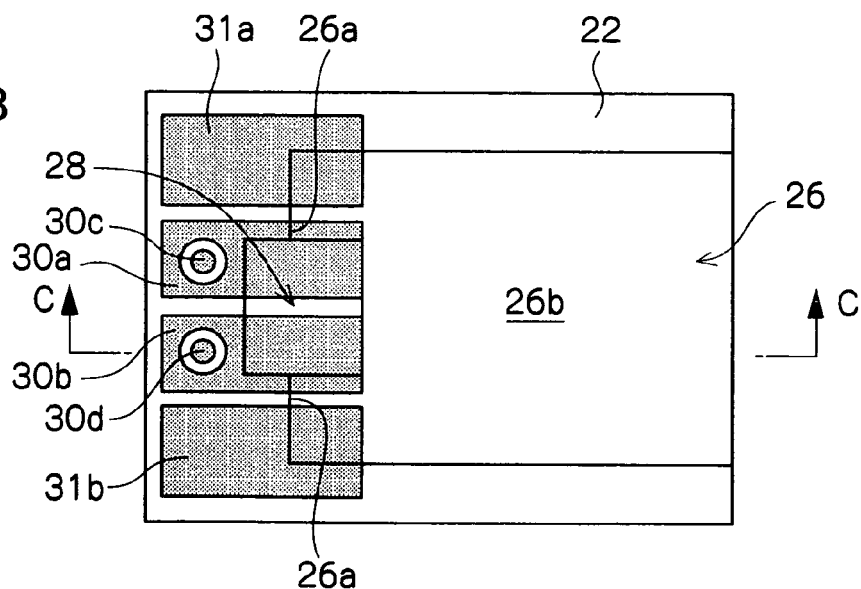
FIG. 8B is a plan view illustrating the sub-mount of the light transmission and reception module according to the embodiment.
Figure 8C:
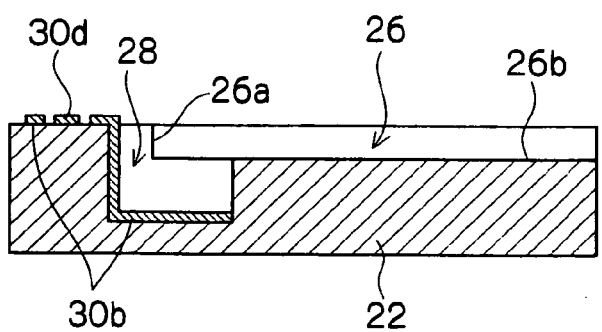
FIG. 8C is a sectional view of C—C of FIG. 8B.

First, referring to FIGS. 8A to 8C, the configuration of the sub-mount 22 is explained. FIG. 8A is a perspective view of the sub-mount 22, FIG. 8B is a plan view of the sub-mount 22, and FIG. 8C is a sectional view C—C of FIG. 8B.

The sub-mount 22 is made of a rectangular parallelepiped substrate. This sub-mount 22 has a recess 26 (a recess for mounting optical components) for mounting a macromolecular optical waveguide film 10, and a recess 28 (a recess for mounting optical components) for fitting and holding (mounting) a light detecting element and a light emitting element. In this example, one recess 28 is formed, but two recesses may be formed corresponding to each of the light detecting element and the light emitting element. The recess 26 includes an applied surface 26a attached to the abutting surface 10a of the macromolecular optical waveguide film 10, and a mounting surface 26b for mounting a film surface 10c of the macromolecular optical waveguide film 10.

In part of the surface of the sub-mount 22, electrode films 30a, 30b, 30c, 30d are formed for electrical wiring with the light detecting element and the light emitting element. In this example, the electrode films 30a, 30b are patterned so as to be extended to the top surface of the sub-mount 22 from the bottom surface of the recess 28 by way of the side surface.

The electrode films 30c, 30d are patterned on the top surface of the sub-mount 22 so as to be insulated from the electrode films 30a, 30b. By forming the electrode films at the sub-mount 22, electrical wiring is easily provided to the light detecting element and the light emitting element when installing the light transmission and reception module in a package.

Electrode films 31a and 31b for realizing electric wiring to the power supply wires are formed on a part of the surface of the sub-mount 22. In this example, the electrode films 31a and 31b are patterned around an applied surface 26a of the sub-mount 22. The electrode films 31a and 31b are patterned on a top surface of the sub-mount 22 so as to be insulated from another electrode films.

The sub-mount 22 is produced at a high precision by the manufacturing method using the above-mentioned duplication method with the mold. The electrode films 30a, 30b, 30c, 30d are, for example, formed by vapor-depositing a metal film of gold (Au), aluminum (Al) or the like on the surface of sub-mount 22, and patterning this metal film by the technology of photolithography.

Figure 9A:
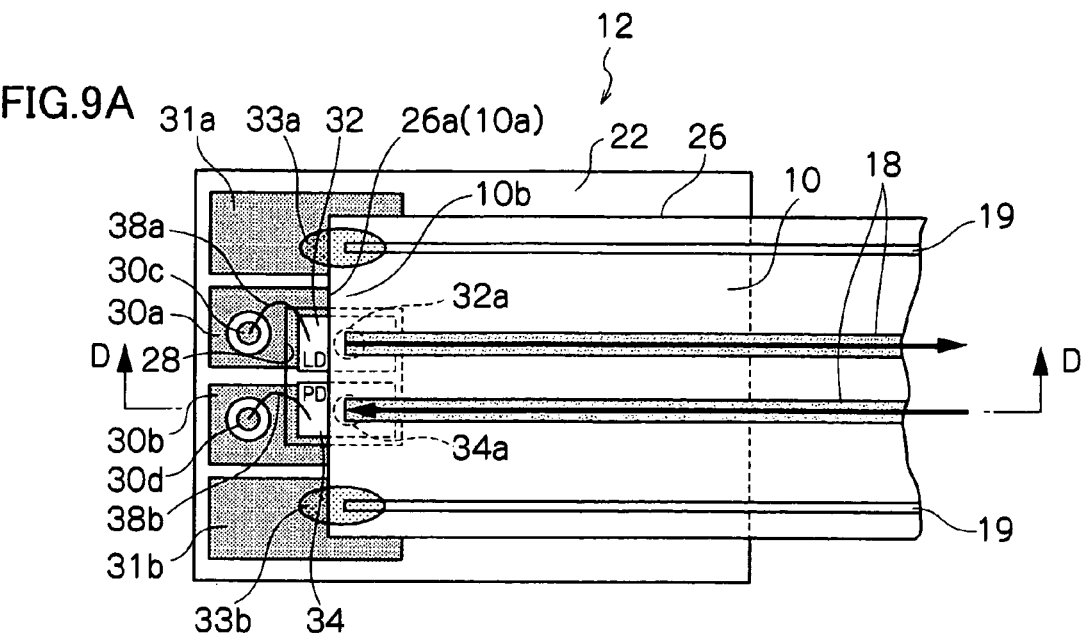
FIG. 9A is a plan view illustrating an optical transmission and reception section of the light transmission and reception module according to the embodiment.
Figure 9B:
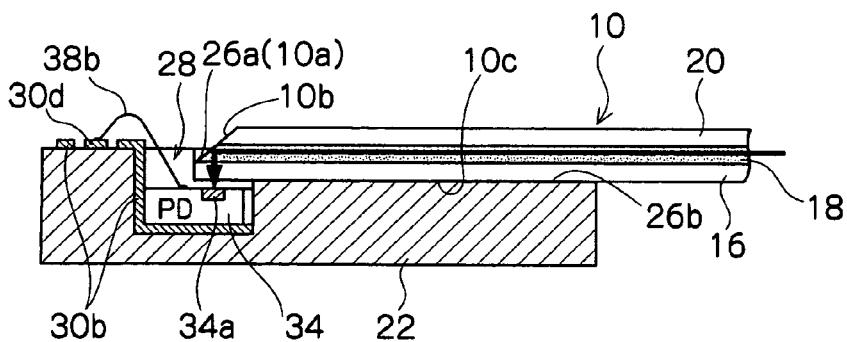
FIG. 9B is a sectional view of D—D of FIG. 9A.
Figure 9C:
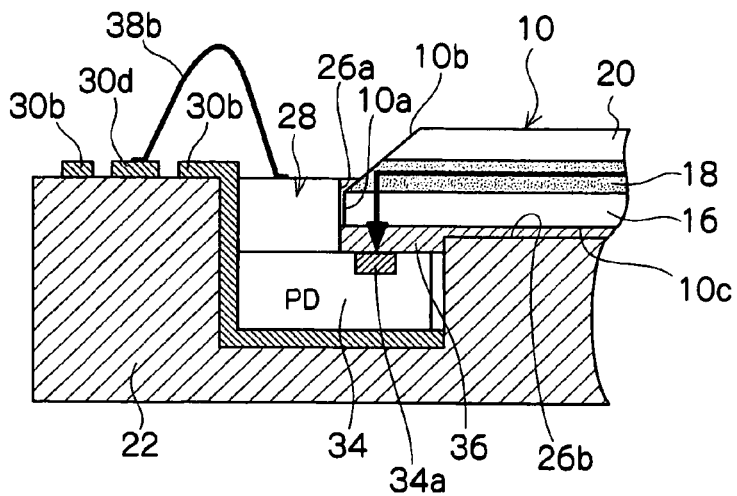
FIG. 9C is a partially enlarged diagram illustrating an enlarged photocoupled portion of FIG. 9B.

Referring next to FIGS. 9A to 9C, a mounting state of an optical transmission and reception section 12 is explained. FIG. 9A is a plan view of the optical transmission and reception section 12, FIG. 9B is a sectional view taken along D—D (sectional view along the optical axis of optical waveguide) of FIG. 9A, and FIG. 9C is a partially magnified view showing an optical coupler in FIG. 9B. The position regulating portions 21 are omitted in the drawings.

When mounting the light transmission and reception module, a surface emission type semiconductor laser diode (LD) 32 as the light emitting element, a photo diode (PD) 34 as the light detecting element, and the macromolecular optical waveguide film 10 are held on the sub-mount 22 of the optical transmission and reception section 12.

The end of the macromolecular optical waveguide film 10 is fitted into the recess 26 of the sub-mount 22. The abutting surface 10a abuts against the applied surface 26a of the sub-mount 22 and is positioned at specified location. The film surface 10c of the light incident and exit side is mounted on the sub-mount 22 so as to oppose to the mounting surface 26b of the sub-mount 22. Thus, holding the macromolecular optical waveguide film 10 on the mounting surface 26b, the flexible macromolecular optical waveguide film 10 can be held stably.

The film surface 10c is adhered to the opposing mounting surfaces 26b, LD 32 and PD 34 by means of adhesive 36. The adhesive 36 may be photosetting adhesive such as ultraviolet curable resin, or thermosetting resin, but in order to reduce the optical loss, it is preferable to use the same curable resin as used in the cladding 16 of the macromolecular optical waveguide film 10.

The electrode films 31a and 31b are electrically connected to the power supply wires 19 respectively with conducting pastes 33a and 33b. The two power supply wires 19 are exposed from the mirror 10b of the optical waveguide film 10.

The LD 32 and the PD 34 are fitted in the recess 28 of the sub-mount 22, and are fixed in the bottom surface of the recess 28. By fitting the LD 32 and the PD 34 in the recess 28, the optical transmission and reception section 12 is made compact. In this example, the electrode films 30a and 30b are formed in the bottom surface of the recess 28. Therefore, the back electrode of the LD 32 and the electrode film 30a, and the back electrode of the PD 34 and the electrode film 30b are fixed in the bottom surface of the recess 28 by conductive solder (electroconductive paste) or the like so as to conduct with each other electrically.

The other electrode of LD 32 is electrically connected to the electrode film 30c by wire 38a, and the other electrode of PD 34 is electrically connected to the electrode film 30d by wire 38b.

The LD 32 and PD 34 are disposed at specified positions, depending on the abutting position of the abutting surface 10a, so that the emitter 32a of the LD 32 is opposite to the end surface (incident end surface) of the core 18 of the optical waveguide for transmission of macromolecular optical waveguide film 10, and that the detector 34a of the PD 34 is opposite to the end surface (exit end surface) of the core 18 of optical waveguide for reception of macromolecular optical waveguide film 10.

Herein, the optical waveguide for transmitting an optical signal from the optical transmission and reception section 12 is described as the optical waveguide for transmission, and the optical waveguide for receiving an optical signal from the optical transmission and reception section 12 is described as the optical waveguide for reception. As seen from the optical transmission and reception section 14, needless to say, the optical waveguide for transmission and optical waveguide for reception are inverted.

The optical transmission and reception section 12 can be assembled easily, by fitting the LD 32 and PD 34 in the recess 28 of the sub-mount 22 and fitting the macromolecular optical waveguide film 10 in the recess 26 of the sub-mount 22.

In this embodiment, the macromolecular optical waveguide film 10 is composed of a transparent resin, and the position of end of the core 18 of the optical waveguide can be observed through back surface reflection of the mirror 10b. Therefore, by using the back surface reflection image on the mirror 10b, alignments of LD 32 and PD 34 become easy to be mounted in high precision by passive alignment.

Operation of Light Transmission and Reception Module

Figure 10:
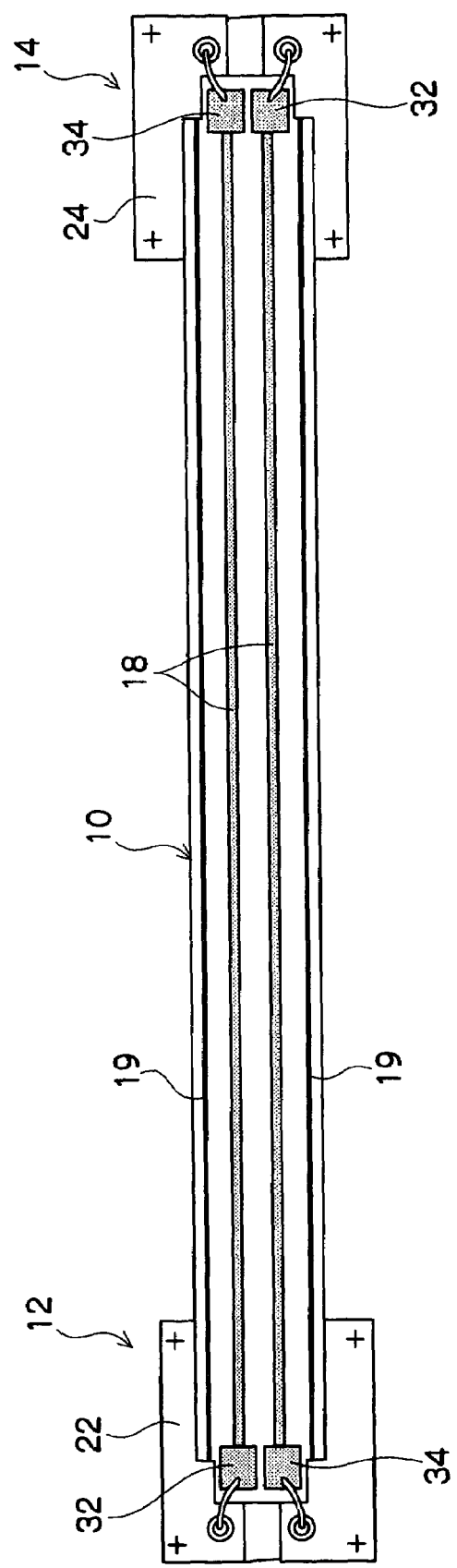
FIG. 10 is a diagram typically illustrating a constitution of the light transmission and reception module according to the embodiment.

Referring to FIG. 10, the operation of the light transmission and reception module of the embodiment is explained. FIG. 10 is a view schematically showing a structure of light transmission and reception module. Herein, the optical waveguide for transmitting an optical signal from the optical transmission and reception section 12 is designated as the optical waveguide for transmission, and the optical waveguide for receiving an optical signal from the optical transmission and reception section 12 is designated as the optical waveguide for reception. The position regulating portions 21 are omitted.

In the light transmission and reception module of the embodiment, when transmitting an optical signal from the optical transmission and reception section 12 to the optical transmission and reception section 14, the light emitted from the LD 32 held on the sub-mount 22 of the optical transmission and reception section 12 is coupled to the incident end surface of the core 18 of the optical waveguide for transmission, and is guided in the optical waveguide for transmission formed in the macromolecular optical waveguide film 10. The light emitted from the exit end surface of the core 18 of the optical waveguide for transmission is received in the PD 34 held in the sub-mount 24 of the optical transmission and reception section 14.

Similarly, when receiving an optical signal transmitted from the optical transmission and reception section 14 by the optical transmission and reception section 12, the light emitted from the LD 32 held in the sub-mount 24 of the optical transmission and reception section 14 is coupled to the incident end surface of the core 18 of the optical waveguide for reception, and is guided in the optical waveguide for reception formed in the macromolecular optical waveguide film 10. The light emitted from the exit end surface of the core 18 of optical waveguide for reception is received in the PD 34 held in the sub-mount 22 of the optical transmission and reception section 12.

As explained above, in the light transmission and reception module of the embodiment, two way light communications are performed between a set of optical transmission and reception sections as mentioned above. The flexible belt-shaped macromolecular optical waveguide film has a property of following up the deformation such as bending, folding or twisting, so that even if the film is deformed, optical signal can be transmitted and received by way of the optical waveguide formed in the macromolecular optical waveguide film. Therefore, it can be used in optical wiring of often-bent-or-folded connection of cell phone, slim personal computer or other mobile appliance.

In the light transmission and reception module of the embodiment, since the electrode film is formed in the sub-mount, when installing the light transmission and reception module in a package, electrical wiring can be easily provided in the light detecting element and in the light emitting element of the optical transmission and reception section.

In the light transmission and reception module in the embodiment, the power supply wires are provided onto the optical waveguide film so as to annex the waveguide cores. Both of the power supply wires and the waveguide cores are surrounded by the cladding so as to be integrally molded. As a result, the power supply can be realized at an extremely low cost.

In the embodiment, it is explained that the power supply wire is provided in the gap between the paired position regulating portions, but the power supply wire can be independently provided by applying conducting paste or by a sputtering method.

Another Arrangement of Electrode

Figure 11A:
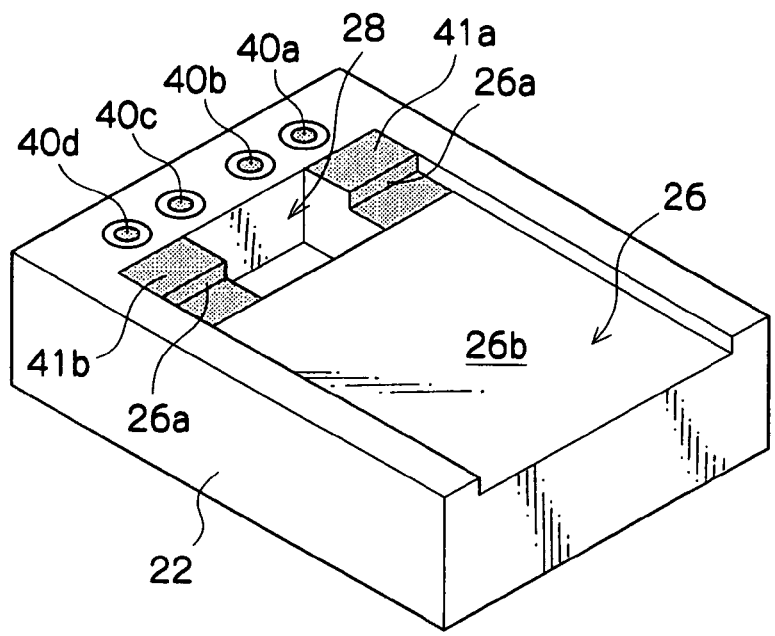
FIGS. 11A and 11B are diagrams illustrating another arrangement pattern of an electrode film.
Figure 11B:
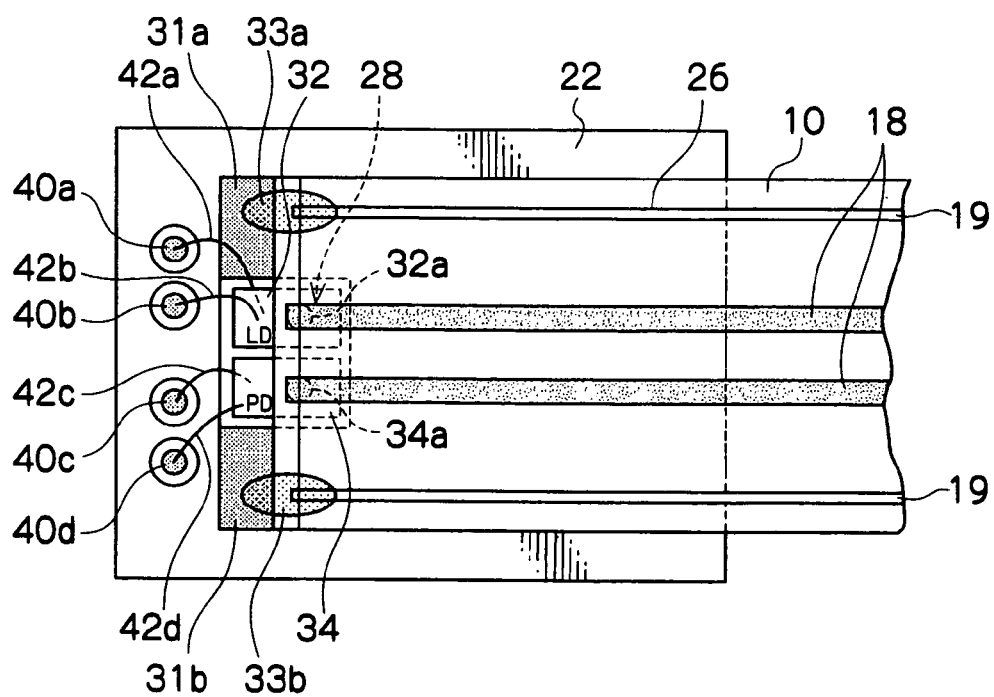

In the embodiment, it is explained that the electrode film is formed so as to extend from the bottom surface of the recess formed on the sub-mount via the side surface to the top surface of the sub-mount and the rear electrodes of LD and PD and the electrode films are electrically conductive, but the forming pattern of the electrode films is not limited to this. For example as shown in FIG. 11A, electrode films 40a, 40b, 40c and 40d which are insulated from each other are formed on the top surface of the sub-mount 22. When the light transmission and reception module is mounted, as shown in FIG. 11B, the electrode films 40a and 40b may be electrically connected to the electrodes of the LD 32 by wires 42a and 42b, and the electrode films 40c and 40d may be electrically connected to the electrodes of the PD 34 by wires 42c and 42d.

Another Constitution of Module

In the embodiment, it is explained that the light transmission and reception module of two way optical communications having the light transmission and reception sections respectively mounted with both the light emitting element and the light detecting element. However, the light transmission and reception module may be one way type which is constituted with a light transmission section having a light emitting element and a light reception section having a light detecting element.

EXAMPLES

The invention is more specifically described below by referring to examples, but the invention is not limited to these examples alone.

Example 1

In Example 1, a light transmission and reception module shown in FIG. 1 is produced.

(Production of Macromolecule Optical Waveguide Film)

After an Si substrate is coated with a thick film resist (trade name: SU-8, manufactured by Microchemical) according to a spin coat method, it is prebaked at 80 deg. C., is exposed through a photomask and is developed so that four first projections having a quadrate section (width: 50 μm, height: 50 μm, length: 80 mm: each projection corresponding to core) are formed. Two pairs of second projections (width: 50 μm, height: 50 μm, length: 80 mm: each projection corresponding to the position regulating portion of the power supply wire) are formed at both sides with respect to the four first projections so as to be parallel with each other. A gap between the first projections and a gap between the first projection and the paired second projections (second projection which is the closest to the first projection) are set to 250 μm. A gap between each paired second projections is set to 50 μm. The Si substrate coated with the thick film resist is post-baked at 120 deg. C., so that a master plate for manufacturing a macromolecular waveguide is produced.

A releasing agent is applied on the master plate, and a mixture of thermosetting liquid dimethyl siloxane rubber (product name: SYLGARD184 manufactured by Dow-Corning Asia, viscosity 5000 mPa·s) and its hardening agent is poured in, and heated and cured for 30 minutes at 120 deg. C. After releasing, a die (die thickness: 5 mm) having recesses corresponding to the projections of a rectangular section is produced.

Further, through-holes of circular top view, having a section tapered in mold thickness direction are formed by punching to communicate with the recesses at both ends of each recess, whereby a mold is produced.

This mold is adhered tightly to a film base material for cladding (product name: Arton Film manufactured by JSR Co., refractive index 1.510) of film thickness of 50 μm, which is one size larger than the mold.

A few drops of ultraviolet curable resin of viscosity of 500 mPa·s are dropped into supply side through-hole of the mold, and the discharge side (i.e., the evacuating and sucking side) through-hole is evacuated and sucked, such that the recess is filled with the ultraviolet curable resin in 10 minutes. It is cured by emitting ultraviolet light of 50 mW/cm$^2$ irradiated from outside of the mold for 5 minutes, and the mold is separated from Arton Film, whereby cores of same shapes as projecting portions of the master plate are formed on the Arton Film. Further, at the both sides of the four cores, two pairs of the position regulating portions are formed in parallel each other in such a way that the cores are sandwiched.

After a copper wire with diameter of 50 μm is constructed in the respective gaps between the two pairs of the position regulating portions, the ultraviolet curable resin with the same refractive index of 1.510 after curing as that of the Arton film is applied to the core formed surface of the Arton film, and the film base materials for cladding of 50 μm are laminated. The ultraviolet curable resin is cured by emitting ultraviolet light of 50 mW/cm2 for five minutes so that two films are adhered, thereby a belt-shaped macromolecular optical waveguide film with width of 1.5 mm and thickness of 180 µm is obtained.

Using a dicing saw with a Si blade angled by 45 degrees, both ends of this macromolecular optical waveguide film are cut off at an angle of 45 degrees with respect to the optical axis, such that each core having a 45-degree mirror surface is exposed. Each cladding portion of the 45-degree mirror surfaces is cut off vertically to the optical axis at a position of 50 µm inside from the leading end, and a macromolecular optical waveguide film having 45-degree mirror surfaces and vertical cut sections at both ends is obtained. Copper wires for power supply are exposed on the mirror.

(Production of Sub-Mount)

On Si substrate of 600 µm in thickness, two recesses for mounting light emitting element and light detecting element are formed by RIE. The depth of recess is 250 µm. Further, to mount the macromolecular optical waveguide film, a recess of 50 µm in depth having an applied surface opposing to the vertical cut section of the macromolecular optical waveguide film is formed by RIE method. The Si master substrate having the recesses is prepared as a master plate of the sub-mount. In this master plate, recesses for a plurality of sub-mounts are formed and by using this master plate, a plurality of sub-mounts can be reproduced simultaneously.

On this master plate, a mixture of thermosetting liquid dimethyl siloxane rubber (product name: SYLGARD184, manufactured by Dow-Corning Asia, viscosity 5000 mPa·s) and its hardening agent is poured in, and heated and cured for 30 minutes at 120 deg. C. After releasing the cured layer, a silicone resin mold (die thickness: 5 mm) having projections and recesses corresponding to the projections and recesses of the master plate on its surface is produced.

Ultraviolet curable resin (of NTT-AT) with viscosity of 3000 mPa·s is applied, and ultraviolet light of 50 mW/cm$^2$ is irradiated from outside of the mold for 5 minutes to cure, and the cured resin layer is released from the mold. After vapor-depositing Au in a thickness of 200 nm on the cured resin layer, the Au electrodes are patterned by photolithography, whereby electrode pads for lower electrodes extending from a bottom surface to a side surface of each recess up to a top surface of the sub-mount, electrode pads for upper electrodes insulated from the electrode pads for lower electrodes, and electrode pads for the electric supply wires are formed. By cutting the cured resin layer having electrode pads by using a dicer, a plurality of sub-mounts A made of ultraviolet curable resin are formed.

Dimensional difference of projections and recesses as seen from the master substrate is within 100 nm, and sub-mounts A made of ultraviolet curable resin can be produced at high precision.

(Mounting of Module)

The recess for the light emitting element of the sub-mount A is filled with conducting paste (trade name: SA-0425, manufactured by FUJIKURA KASEI CO., LTD.) by a dispenser, and a VCSEL element (manufactured by Fuji Xerox, Co., Ltd.) is placed. The recess for the light detecting element of the sub-mount A is filled with the conducting paste (product name: SA-0425, manufactured by FUJIKURA KASEI CO., LTD.) by a dispenser, and a photodiode element is placed. After each element is disposed, the sub-mount A is heated to 180 deg. C. for 30 minutes so that the VCSEL element and the photodiode element are fixed to the predetermined recesses of the sub-mount A, respectively. As a result, each lower electrode of the VCSEL element and the photodiode element is electrically connected to the electrode pad. Thereafter, the respective upper electrode of the VCSEL element and the photodiode element and the electrode pads are bonded by using an Au wire.

Both ends of the macromolecular optical waveguide film having 45-degree mirrors are respectively fitted into the recess of the sub-mount A, the vertical cut section is positioned by abutting against the applied surface of the sub-mount A, and macromolecular optical waveguide film is fixed to sub-mount A by using ultraviolet curing agent (adhesive). Thereafter, the copper wires exposed on the mirror surfaces of the macromolecular optical waveguide film and the electrode pads on the sub-mounts A are electrically connected by applying electroconductive paste. As a result, a two-way light transmission and reception module of example 1 having a pair of optical transmission and reception sections and macromolecular optical waveguide film is obtained.

(Evaluation of Communication Performance)

Light transmission and reception performance of a two-way light transmission and reception module which is obtained according to Example 1 was evaluated by using a sampling oscilloscope (product name: Agilent 86100C, manufactured by Agilent Technologies) and a pulse pattern generator. As a result, satisfactory eye pattern could be measured at up to 3.125 Gbps. When a power is supplied from an electrode pad of one sub-mount A, it was confirmed that an electrode pad of the other sub-mount A is energized, and it was found that the power can be supplied by the macromolecular optical waveguide film.

Example 2

A macromolecular optical waveguide film is produced similarly to Example 1 except that a gold wire is used instead of the copper wire. A two-way light transmission and reception module is obtained by using this film. When a power was supplied from an electrode pad of one sub-mount A of the module, it was confirmed that an electrode pad of the other sub-mount A was energized, and it was found that the power can be supplied by the macromolecular optical waveguide film.

Example 3

A macromolecular optical waveguide film is produced similarly to Example 1 except that the power supply wires are formed by applying (filling) conducting paste (product name: XA-874, manufactured by FUJIKURA KASEI CO., LTD.) to the gaps between the two pairs of the position regulating portions by a dispenser. A two-way light transmission and reception module is obtained by using this film. When a power was supplied from an electrode pad of one sub-mount A, it was confirmed that an electrode pad of the other sub-mount A was energized, and it was found that the power could be supplied by the macromolecular optical waveguide film.

The above embodiments of the present invention provide examples of a macromolecular optical waveguide film enabling a power supply and a two-way light transmission and reception module using the film; however, the present invention is not limited to these embodiments, but various modifications can be made. It is obvious for the skilled person in the art that such modifications are also included in the scope of the invention.

In the optical waveguide film in the present invention, a conductor for power supply is provided so as to be adjacent to a waveguide core, so that the conductor is surrounded by a cladding to be integral with the waveguide core. The optical waveguide film enabling the power supply at extremely low cost can be obtained.

When the conductor is provided so as to be held between a pair of position regulating members, the conductor can be easily positioned and is prevented from being distorted or shifted due to impact, thereby reliability of a module is improved.

When two conductors are provided at both ends while the waveguide core is located between the conductors in the optical waveguide film width direction, so that external connections with the conductors are facilitated.

When the conductor contains at least one selected from copper, iron, nickel, gold, aluminum and alloy of these metals, satisfactory power supply is realized.

When the conductor is obtained by applying conducting paste, the conductor can be formed easily.

When a conductive wire is used as the conductor, satisfactory power supply is realized.

As explained above, according to the present invention, the optical waveguide film which enables the power supply at extremely low cost and the light transmission and reception module using this film can be manufactured.

What is claimed is:

1. A light transmission and reception module, comprising:
   an optical waveguide film comprising:
      a waveguide core that extends in a film length direction and guides light as waveguide light;
      a conductor for power supply that extends in the film length direction and is provided in parallel with the waveguide core; and
      a cladding that surrounds the waveguide core and the conductor,
   a light transmitting section that has a light emitting element and a sub-mount for holding the light emitting element, and holds one end of the optical waveguide film onto the sub-mount so that light emitted from the light emitting element is coupled with an incident end surface of the optical waveguide; and
   a light detecting section that has a light detecting element and a sub-mount for holding the light detecting element, and holds the other end of the optical waveguide film onto the sub-mount so that light emitted from an emission end surface of the optical waveguide is detected by the light detecting element.

2. The light transmission and reception module of claim 1, wherein the conductor of the optical waveguide film is provided so as to be held between a pair of position regulating members.

3. The light transmission and reception module of claim 1, wherein two conductors are provided to the optical waveguide film, and the waveguide core is provided between the two conductors.

4. The light transmission and reception module of claim 1, wherein the conductor of the optical waveguide film contains at least one selected from copper, iron, nickel, gold, aluminum and alloy of these metals.

5. The light transmission and reception module of claim 1, wherein the conductor of the optical waveguide film is provided by applying conductive paste.

6. The light transmission and reception module of claim 1, wherein the conductor of the optical waveguide film is a conductive wire.

* * * * *